(12) United States Patent
Sanandaji et al.

(10) Patent No.: US 10,685,248 B1
(45) Date of Patent: Jun. 16, 2020

(54) COMPUTING SYSTEM WITH DRIVER BEHAVIOR DETECTION MECHANISM AND METHOD OF OPERATION THEREOF

(71) Applicant: MOJ.IO INC., Vancouver (CA)

(72) Inventors: Borhan Molazem Sanandaji, San Jose, CA (US); Xi Liu, San Jose, CA (US)

(73) Assignee: MOJ.IO, Inc., Vancouver, BC (CA)

( * ) Notice: Subject to any disclaimer, the term of this patent is extended or adjusted under 35 U.S.C. 154(b) by 0 days.

(21) Appl. No.: 16/427,090

(22) Filed: May 30, 2019

(51) Int. Cl.
*G06K 9/00* (2006.01)
*G06K 9/62* (2006.01)
*B60W 50/10* (2012.01)
*B60W 50/14* (2020.01)

(52) U.S. Cl.
CPC ......... *G06K 9/00845* (2013.01); *B60W 50/10* (2013.01); *G06K 9/6223* (2013.01); *G06K 9/6257* (2013.01); *B60W 50/14* (2013.01)

(58) Field of Classification Search
CPC ............. G06K 9/00845; G06K 9/6223; G06K 9/6257; B60W 50/10
See application file for complete search history.

(56) References Cited

U.S. PATENT DOCUMENTS

| 8,509,987 B2 | 8/2013 | Resner |
| 8,938,227 B2 | 1/2015 | Silver et al. |
| 10,402,907 B2 * | 9/2019 | Bowne ............... G06Q 10/0639 |
| 2011/0037618 A1 | 2/2011 | Ginsberg et al. |
| 2011/0112717 A1 | 5/2011 | Resner |
| 2014/0106732 A1 | 4/2014 | Silver et al. |
| 2017/0200061 A1 | 7/2017 | Julian et al. |

* cited by examiner

*Primary Examiner* — Curtis B Odom
(74) *Attorney, Agent, or Firm* — Perspectives Law Group, Corp.

(57) ABSTRACT

A computing system and method for operating the computing system including: a control unit configured to: generate a filtered data set based on a data set; group the filtered data set based on a previous origin indicator to obtain a device group data; generate a label based on the device group data; generate a training moving average based on the label and the device group data; generate an operating pattern based on the training moving average; identify a change in a driving behavior based on comparing the operating pattern and a detection moving average; generate a notification based on the change; and a communication unit, coupled to the control unit, configured to: send the notification for display on a display interface.

20 Claims, 8 Drawing Sheets

COMPUTING SYSTEM WITH DRIVER BEHAVIOR DETECTION MECHANISM AND METHOD OF OPERATION THEREOF

TECHNICAL FIELD

An embodiment of the present invention relates generally to a computing system, and more particularly to a computing system with a driver behavior detection mechanism.

BACKGROUND

The ability to detect a driver's behavior can provide many advantages, such as being able to detect patterns, tendencies, and habits. Such information is useful for allowing a driver or a third-party to make inferences about a driver's risk factors and allowing drivers to modify driving behavior when needed. However, despite technological advancements, current technologies still lack the ability to accurately detect a driver's behavior and identify patterns and changes in the driver's behavior. Accordingly, there remains a need for improved techniques for detecting a driver's behavior accurately.

Thus, a need still remains for a computing system with a driver behavior detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems Solutions to these problems have been long sought but prior developments have not taught or suggested any solutions and, thus, solutions to these problems have long eluded those skilled in the art.

SUMMARY

An embodiment of the present invention provides a method of operation of a computing system including: generating a filtered data set based on a data set; grouping the filtered data set based on a previous origin indicator to obtain a device group data; generating a label based on the device group data; generating a training moving average based on the label and the device group data; generating an operating pattern based on the training moving average; identifying a change in a driving behavior based on comparing the operating pattern and a detection moving average; generating a notification based on the change; and sending the notification for display on a display interface.

An embodiment of the present invention provides a computing system including: a control unit configured to: generate a filtered data set based on a data set; group the filtered data set based on a previous origin indicator to obtain a device group data; generate a label based on the device group data; generate a training moving average based on the label and the device group data; generate an operating pattern based on the training moving average; identify a change in a driving behavior based on comparing the operating pattern and a detection moving average; generate a notification based on the change; and a communication unit, coupled to the control unit, configured to: send the notification for display on a display interface.

An embodiment of the present invention provides a non-transitory computer readable medium including instructions for a computing system including: generating a filtered data set based on a data set; grouping the filtered data set based on a previous origin indicator to obtain a device group data; generating a label based on the device group data; generating a training moving average based on the label and the device group data; generating an operating pattern based on the training moving average; identifying a change in a driving behavior based on comparing the operating pattern and a detection moving average; generating a notification based on the change; and sending the notification for display on a display interface.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
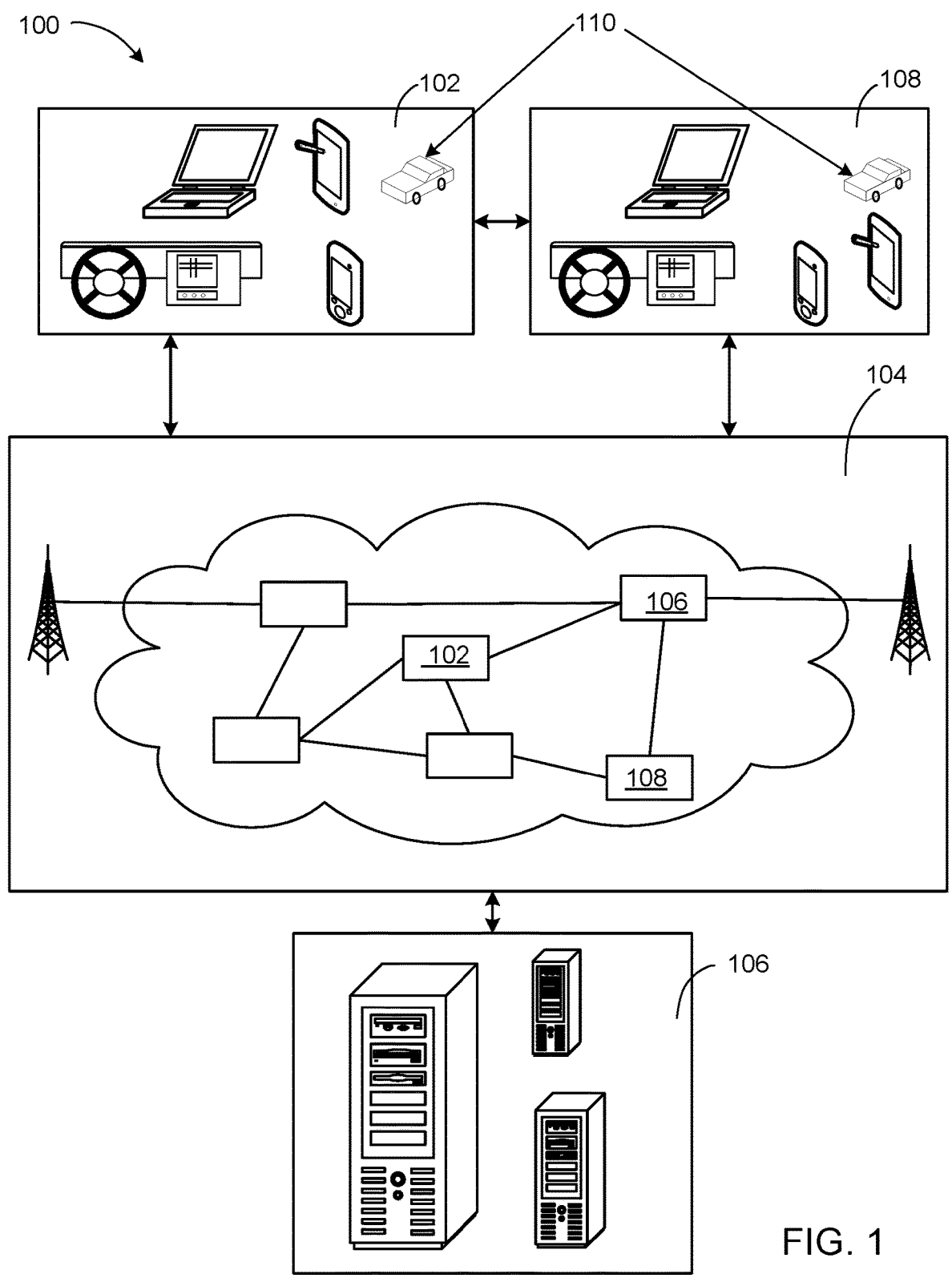
FIG. 1 is a computing system with a driver detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings are for ease of description and generally show similar orientations, this depiction in the figures is arbitrary for the most part. Generally, the invention can be operated in any orientation.

The term "module" or "unit" referred to herein can include software, hardware, or a combination thereof in an embodiment of the present invention in accordance with the context in which the term is used. For example, the software can be machine code, firmware, embedded code, or application software. Also for example, the hardware can be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules and units in the following description of the embodiments can be coupled to one another as described or as shown. The coupling can be direct or indirect without or with intervening items between coupled modules or units. The coupling can be by physical contact or by communication between modules or units.

Referring now to FIG. 1, therein is shown a computing system 100 with a driver detection mechanism in an embodiment of the present invention. The computing system 100 includes a first device 102, such as a client or a server, connected to a second device 106, such as a client or server. The first device 102 can be further connected to a third device 108, such as a client or a server. The second device 106 can be further connected to the third device 108. The first device 102, the second device 106, and the third device 108 can communicate with each other through a communication path 104, such as a wireless or wired network.

For example, the first device 102 and the third device 108 can be of any of a variety of devices, such as a smart phone, a cellular phone, a personal digital assistant, a tablet computer, a notebook computer, a laptop computer, a desktop computer, or part of a vehicle integrated communication system, such as an OBD-2 adapter or a vehicle infotainment system. The first device 102 and the third device 108 can couple, either directly or indirectly, to the communication path 104 to communicate with the second device 106 or can be stand-alone devices. The first device 102 and the third device 108 can be incorporated in a vehicle 110. The vehicle 110 can include cars, trains, buses, bicycles, boats, motorcycles, airplanes, helicopters, or any other mode of transport, or a combination thereof in an embodiment of the present invention in accordance with the context in which the term is used.

The second device 106 can be any of a variety of centralized or decentralized computing devices. For example, the second device 106 can be a laptop computer, a desktop computer, grid-computing resources, a virtualized computing resource, cloud computing resources, routers, switches, peer-to-peer distributed computing devices, a server, or a combination thereof. The second device 106 can be centralized in a single room, distributed across different rooms, distributed across different geographical locations, or embedded within a telecommunications network. The second device 106 can couple with the communication path 104 to communicate with the first device 102, the third device 108, or a combination thereof. The second device 106 can be incorporated in the vehicle 110.

For illustrative purposes, the computing system 100 is shown with the first device 102 and the third device 108 as client devices, although it is understood that the computing system 100 can have the first device 102 or the third device 108 as a different type of device. For example, the first device 102 or the third device 108 can be a server. Also for illustrative purposes, the computing system 100 is shown with the second device 106 as a server, although it is understood that the computing system 100 can have the second device 106 as a different type of device. For example, the second device 106 can be a client device.

For brevity of description in the embodiments discussed below, the first device 102 and the third device 108 will be described as client devices and the second device 106 will be described as a server device. The embodiments of the present invention, however, are not limited to this selection for the type of devices. The selection is an example of an embodiment of the present invention.

Also for illustrative purposes, the computing system 100 is shown with the first device 102, the second device 106, and the third device 108 as end points of the communication path 104, although it is understood that the computing system 100 can have a different partition between the first device 102, the second device 106, the third device 108, and the communication path 104. For example, the first device 102, the second device 106, the third device 108, or a combination thereof can also function as part of the communication path 104.

The communication path 104 can span and represent a variety of networks and network topologies. For example, the communication path 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
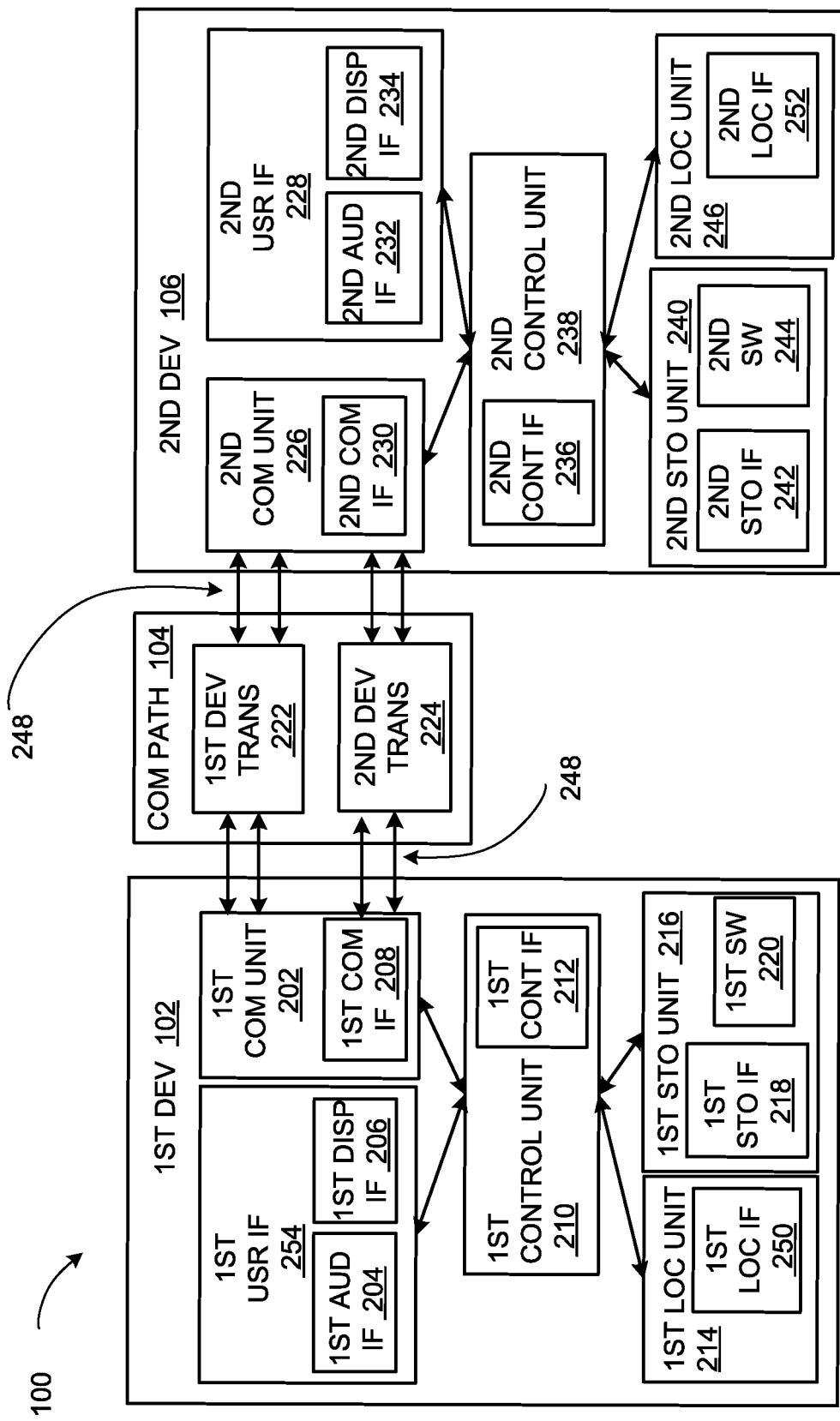
FIG. 2 is an exemplary block diagram of the components of the computing system in an embodiment of the present invention.

Referring now to FIG. 2, therein is shown an exemplary block diagram of the components of the computing system 100 in an embodiment of the present invention. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more communication channels 248. A communication channel 248 refers either to a physical transmission medium such as a wire, or to a logical connection over a multiplexed medium such as a radio channel.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 210, a first storage unit 216, a first communication unit 202, optionally a first user interface 254, and a first location unit 214. The first control unit 210 can include a first control interface 212. The first control unit 210 can execute a first software 220 to provide the intelligence of the computing system 100. The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), or a combination thereof.

The first control interface 212 can be used for communication between the first control unit 210 and other functional units in the first device 102. The first control interface 212 can also be used for communication that is external to the first device 102. The first control interface 212 can receive information from the other functional units of the first device 102 or from external sources, or can transmit information to the other functional units of the first device 102 or to external destinations. The external sources and the external destinations refer to sources and destinations external to the first device 102. The first control interface 212 can be implemented in different ways and can include different implementations depending on which functional units or external units are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, an application programming interface, or a combination thereof.

The first storage unit 216 can store the first software 220. For illustrative purposes, the first storage unit 216 is shown as a single element, although it is understood that the first storage unit 216 can be a distribution of storage elements. Also for illustrative purposes, the computing system 100 is shown with the first storage unit 216 as a single hierarchy storage system, although it is understood that the computing system 100 can have the first storage unit 216 in a different configuration. For example, the first storage unit 216 can be formed with different storage technologies forming a memory hierarchal system including different levels of caching, main memory, rotating media, or off-line storage. The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM).

The first storage unit 216 can include a first storage interface 218. The first storage interface 218 can be used for communication between the first storage unit 216 and other functional units in the first device 102. The first storage interface 218 can also be used for communication that is external to the first device 102. The first storage interface 218 can receive information from the other functional units of the first device 102 or from external sources, or can transmit information to the other functional units or to external destinations. The first storage interface 218 can include different implementations depending on which functional units or external units are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106, the third device 108 of FIG. 1, an attachment, such as a peripheral device, and the communication path 104. The first communication unit 202 can also function as a communication hub allowing the first device 102 to function as part of the communication path 104 and not be limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units of the first device 102. The first communication interface 208 can receive information from the other functional units of the first device 102 or from external sources, or can transmit information to the other functional units or to external destinations. The first communication interface 208 can include different implementations depending on which functional units are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device 102 in the first device transmission 222 through the communication path 104.

The first user interface 254 can present information generated by the computing system 100. In one embodiment, the first user interface 254 allows a user of the computing system 100 to interface with the first device 102. The first user interface 254 can include an input device and an output device. Examples of the input device of the first user interface 254 can include a keypad, buttons, switches, touchpads, soft-keys, a keyboard, a microphone, sensors for receiving remote signals, or any combination thereof to provide data and communication inputs. Examples of the output device can include a first display interface 206 and a first audio interface 204. The first control unit 210 can operate the first user interface 254 to present information generated by the computing system 100. The first control unit 210 can also execute the first software 220 to present information generated by the computing system 100, or to control other functional units of the computing system 100.

The first display interface 206 can be any graphical user interface such as a display, a projector, a video screen, or any combination thereof. The first audio interface 204 can include sensors, speakers, microphones, headphones, subwoofers, surround sound components, transducers, or any combination thereof. The first display interface 206 and the first audio interface 204 allow a user of the computing system 100 to interact with the computing system 100.

The first location unit 214 can generate location information, current heading, and current speed of the first device 102, as examples. The first location unit 214 can be implemented in many ways. For example, the first location unit 214 can function as at least a part of a global positioning system (GPS) and can include components, such as a GPS receiver, an inertial navigation system, a cellular-tower location system, a pressure location system, an accelerometer, a gyroscope, or any combination thereof.

The first location unit 214 can include a first location interface 250. The first location interface 250 can be used for communication between the first location unit 214 and other functional units in the first device 102. The first location interface 250 can also be used for communication that is external to the first device 102. The first location interface 250 can be implemented with technologies and techniques similar to the implementation of the first control interface 212.

The second device 106 can be optimized for implementing an embodiment of the present invention in a multiple device embodiment with the first device 102 and the third device 108 of FIG. 1. The second device 106 can provide additional or higher performance processing power compared to the first device 102, the third device 108, or a combination thereof. The second device 106 can include a second control unit 238, a second storage unit 240, a second communication unit 226, optionally a second user interface 228, and a second location unit 246.

The second control unit 238 can include a second control interface 236. The second control unit 238 can execute a second software 244 to provide the intelligence of the computing system 100. The second software 244 can also operate independently or in conjunction with the first software 220. The second control unit 238 can provide additional performance compared to the first control unit 210. The second control unit 238 can be implemented in a number of different ways. For example, the second control unit 238 can be a processor, an application specific integrated circuit (ASIC), an embedded processor, a microprocessor, a hardware control logic, a hardware finite state machine (FSM), a digital signal processor (DSP), or a combination thereof.

The second control unit 238 can include a second control interface 236. The second control interface 236 can be used for communication between the second control unit 238 and other functional units of the second device 106. The second control interface 236 can also be used for communication that is external to the second device 106. The second control interface 236 can receive information from the other functional units of the second device 106 or from external sources, or can transmit information to the other functional units of the second device 106 or to external destinations. The external sources and the external destinations refer to sources and destinations external to the second device 106. The second control interface 236 can be implemented in different ways and can include different implementations depending on which functional units or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, an application programming interface, or a combination thereof.

The second storage unit 240 can store the second software 244. The second storage unit 240 can be sized to provide the additional storage capacity to supplement the first storage unit 216. For illustrative purposes, the second storage unit 240 is shown as a single element, although it is understood that the second storage unit 240 can be a distribution of storage elements. Also for illustrative purposes, the computing system 100 is shown with the second storage unit 240 as a single hierarchy storage system, although it is understood that the computing system 100 can have the second storage unit 240 in a different configuration. For example, the second storage unit 240 can be formed with different storage technologies forming a memory hierarchal system including different levels of caching, main memory, rotating media, or off-line storage. The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units of the second device 106. The second storage interface 242 can also be used for communication that is external to the second device 106. The second storage interface 242 can receive information from the other functional units of the second device 106 or from external sources, or can transmit information to the other functional units or to external destinations. The second storage interface 242 can include different implementations depending on which functional units or external units are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102, the third device 108 of FIG. 1, an attachment, such as a peripheral device, and the communication path 104. The second communication unit 226 can also function as a communication hub allowing the second device 106 to function as part of the communication path 104 and not be limited to be an end point or terminal unit to the communication path 104. The second communication unit 226 can include active and passive components, such as microelectronics or an antenna, for interaction with the communication path 104. The second communication unit 226 can couple with the communication path 104 to send information to the first device 102 in the second device transmission 224. The first device 102 can receive information in a first communication unit 202 from the second device 106 in the second device transmission 224 through the communication path 104.

The second communication unit 226 can include a second communication interface 230. The second communication interface 230 can be used for communication between the second communication unit 226 and other functional units of the second device 106. The second communication interface 230 can receive information from the other functional units of the second device 106 or from external sources, or can transmit information to the other functional units or to external destinations. The second communication interface 230 can include different implementations depending on which functional units are being interfaced with the second communication unit 226. The second communication interface 230 can be implemented with technologies and techniques similar to the implementation of the second control interface 236.

The second user interface 228 can present information generated by the computing system 100. In one embodiment, the second user interface 228 allows a user of the computing system 100 to interface with the second device 106. The second user interface 228 can include an input device and an output device. Examples of the input device of the second user interface 228 can include a keypad, buttons, switches, touchpads, soft-keys, a keyboard, a microphone, sensors for receiving remote signals, or any combination thereof to provide data and communication inputs. Examples of the output device can include a second display interface 234 and a second audio interface 232. The second control unit 238 can operate the second user interface 228 to present information generated by the computing system 100. The second control unit 238 can also execute the second software 244 to present information generated by the computing system 100, or to control other functional units of the computing system 100.

The second display interface 234 can be any graphical user interface such as a display, a projector, a video screen, or any combination thereof. The second audio interface 232 can include sensors, speakers, microphones, headphones, subwoofers, surround sound components, transducers, or any combination thereof. The second display interface 234 and the second audio interface 232 allow a user of the computing system 100 to interact with the computing system 100.

The second location unit 246 can generate location information, current heading, and current speed of the second device 106, as examples. The second location unit 246 can be implemented in many ways. For example, the second location unit 246 can function as at least a part of a global positioning system (GPS) and can include components, such as a GPS receiver, an inertial navigation system, a cellular-tower location system, a pressure location system, an accelerometer, a gyroscope, or any combination thereof.

The second location unit 246 can include a second location interface 252. The second location interface 252 can be used for communication between the second location unit 246 and other functional units of the second device 106. The second location interface 252 can also be used for communication that is external to the second device 106. The second location interface 252 can be implemented with technologies and techniques similar to the implementation of the second control interface 236.

Figure 3:
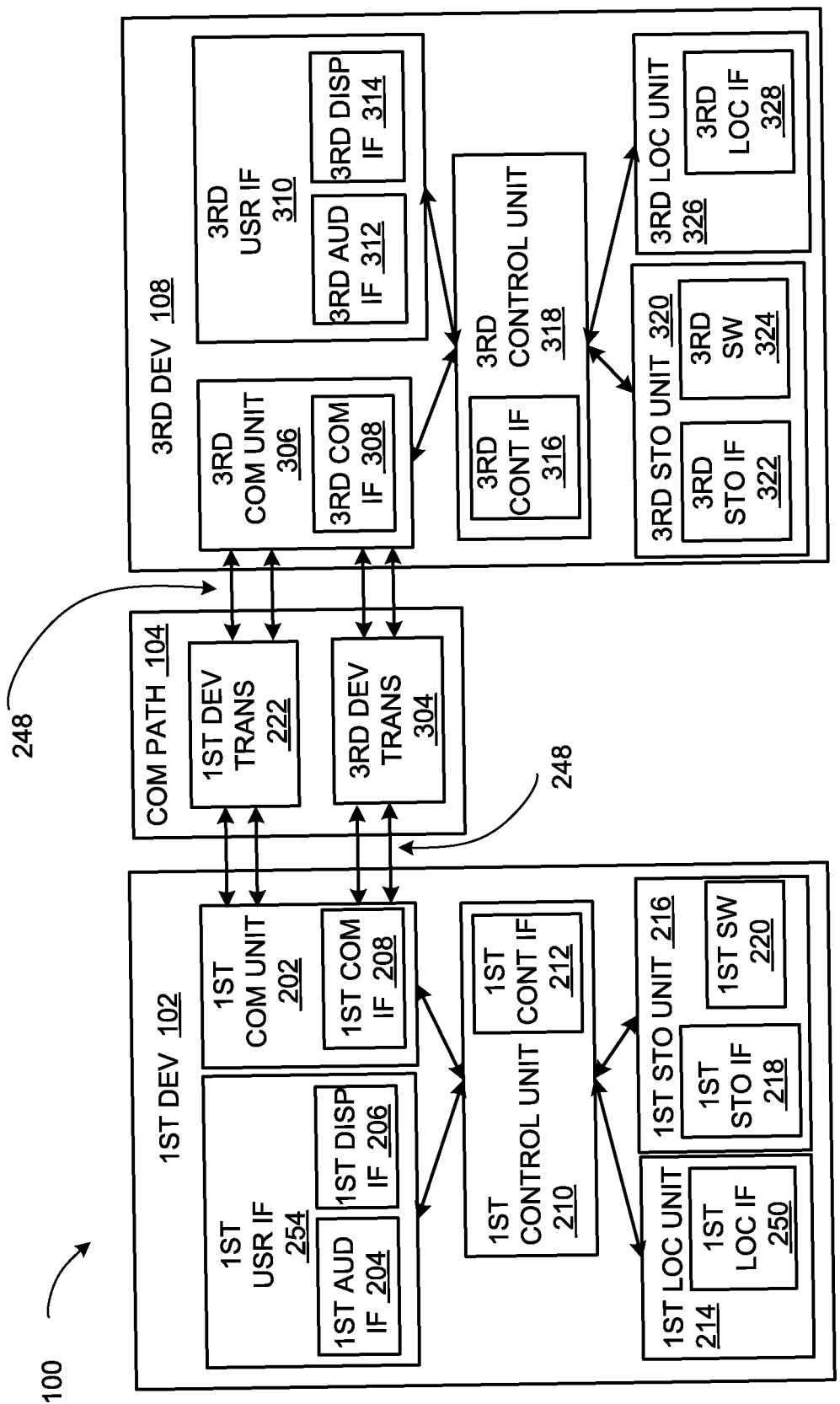
FIG. 3 is a further exemplary block diagram of the components of the computing system in an embodiment of the present invention.

Referring now to FIG. 3, therein is shown a further exemplary block diagram of the components of the computing system 100 in an embodiment of the present invention. The computing system 100 can further include the third device 108. The third device 108 can be optimized for implementing an embodiment of the present invention in a multiple device embodiment with the first device 102 and the second device 106 of FIGS. 1 and 2. The third device 108 can provide additional or higher performance processing power compared to the first device 102, the second device 106, or a combination thereof. The third device 108 can send information in a third device transmission 304 over the communication path 104 to the first device 102. While not shown, the third device 108 can also send information in the third device transmission 304 over the communication path 104 to the second device 106 of FIGS. 1 and 2. The first device 102 can send information in a first device transmission 222 over the communication path 104 to the third device 108. The first device transmission 222 and the third device transmission 304 can be sent over one or more communication channels 248.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the third device 108 as a client device, although it is understood that the computing system 100 can have the third device 108 as a different type of device. For example, the third device 108 can be a server device.

For brevity of description in this embodiment of the present invention, the first device 102 will be described as a client device and the third device 108 will be described as a client device. The embodiment of the present invention is not limited to this selection for the type of devices. The selection is an example of an embodiment of the present invention.

The third device 108 can include a third control unit 318, a third storage unit 320, a third communication unit 306, optionally a third user interface 310, and a third location unit 326.

The third control unit 318 can execute a third software 324 to provide the intelligence of the computing system 100. The third software 324 can operate independently or in conjunction with the first software 220, the second software 244 of FIG. 2, or a combination thereof. The third control unit 318 can be implemented in a number of different ways. For example, the third control unit 318 can be a processor, an application specific integrated circuit (ASIC), an embedded processor, a microprocessor, a hardware control logic, a hardware finite state machine (FSM), a digital signal processor (DSP), or a combination thereof.

The third control unit 318 can include a third control interface 316. The third control interface 316 can be used for communication between the third control unit 318 and other functional units in the third device 108. The third control interface 316 can also be used for communication that is external to the third device 108. The third control interface 316 can receive information from the other functional units of the third device 108 or from external sources, or can transmit information to the other functional units or to external destinations. The external sources and the external destinations refer to sources and destinations external to the third device 108. The third control interface 316 can be implemented in different ways and can include different implementations depending on which functional units or external units are being interfaced with the third control interface 316. For example, the third control interface 316 can be implemented with a pressure sensor, an inertial sensor, a microelectromechanical system (MEMS), optical circuitry, waveguides, wireless circuitry, wireline circuitry, an application programming interface, or a combination thereof.

The third storage unit 320 can store the third software 324. For illustrative purposes, the third storage unit 320 is shown as a single element, although it is understood that the third storage unit 320 can be a distribution of storage elements. Also for illustrative purposes, the computing system 100 is shown with the third storage unit 320 as a single hierarchy storage system, although it is understood that the computing system 100 can have the third storage unit 320 in a different configuration. For example, the third storage unit 320 can be formed with different storage technologies forming a memory hierarchal system including different levels of caching, main memory, rotating media, or off-line storage. The third storage unit 320 can be a volatile memory, a nonvolatile memory, an internal memory, an external memory, or a combination thereof. For example, the third storage unit 320 can be a nonvolatile storage such as non-volatile random access memory (NVRAM), Flash memory, disk storage, or a volatile storage such as static random access memory (SRAM).

The third storage unit 320 can include a third storage interface 322. The third storage interface 322 can be used for communication between the third storage unit 320 and other functional units in the third device 108. The third storage interface 322 can also be used for communication that is external to the third device 108. The third storage interface 322 can receive information from the other functional units of the third device 108 or from external sources, or can transmit information to the other functional units or to external destinations. The third storage interface 322 can include different implementations depending on which functional units or external units are being interfaced with the third storage unit 320. The third storage interface 322 can be implemented with technologies and techniques similar to the implementation of the third control interface 316.

The third communication unit 306 can enable external communication to and from the third device 108. For example, the third communication unit 306 can permit the third device 108 to communicate with the second device 106 of FIGS. 1 and 2, the first device 102, an attachment, such as a peripheral device, and the communication path 104. The third communication unit 306 can also function as a communication hub allowing the third device 108 to function as part of the communication path 104 and not be limited to be an end point or terminal unit to the communication path 104. The third communication unit 306 can include active and passive components, such as microelectronics or an antenna, for interaction with the communication path 104.

The third communication unit 306 can include a third communication interface 308. The third communication interface 308 can be used for communication between the third communication unit 306 and other functional units of the third device 108. The third communication interface 308 can receive information from the other functional units of the third device 108 or from external sources, or can transmit information to the other functional units or to external destinations. The third communication interface 308 can include different implementations depending on which functional units are being interfaced with the third communication unit 306. The third communication interface 308 can be implemented with technologies and techniques similar to the implementation of the third control interface 316.

The third user interface 310 can present information generated by the computing system 100. In one embodiment, the third user interface 310 allows a user of the computing system 100 to interface with the third device 108. The third user interface 310 can include an input device and an output device. Examples of the input device of the third user interface 310 can include a keypad, buttons, switches, a touchpad, soft-keys, a keyboard, a microphone, sensors for receiving remote signals, or any combination thereof to provide data and communication inputs. Examples of the output device can include a third display interface 314 and a third audio interface 312. The third control unit 318 can operate the third user interface 310 to present information generated by the computing system 100. The third control unit 318 can also execute the third software 324 to present information generated by the computing system 100, or to control other functional units of the computing system 100.

The third display interface 314 can be any graphical user interface such as a display, a projector, a video screen, or any combination thereof. The third audio interface 312 can include sensors, speakers, microphones, headphones, subwoofers, surround sound components, transducers, or any combination thereof. The third display interface 314 and the third audio interface 312 allow a user of the computing system 100 to interact with the computing system 100.

The third location unit 326 can generate location information, current heading, and current speed of the third device 108, as examples. The third location unit 326 can be implemented in many ways. For example, the third location unit 326 can function as at least a part of a global positioning system (GPS) and can include components, such as a GPS receiver, an inertial navigation system, a cellular-tower location system, a pressure location system, an accelerometer, a gyroscope, or any combination thereof.

The third location unit 326 can include a third location interface 328. The third location interface 328 can be used for communication between the third location unit 326 and other functional units in the third device 108. The third location interface 328 can also be used for communication that is external to the third device 108. The third location interface 328 can be implemented with technologies and techniques similar to the implementation of the third control interface 316.

Functionality of the computing system 100 can be provided by the first control unit 210, the second control unit 238, the third control unit 318, or a combination thereof. For illustrative purposes, the first device 102 is shown with the partition having the first user interface 254, the first storage unit 216, the first control unit 210, the first location unit 214, and the first communication unit 202, although it is understood that the first device 102 can have a different partition. For example, the first software 220 can be partitioned differently such that some or all of its functionality can be in the first control unit 210 and the first communication unit 202. Also, the first device 102 can include other functional units not shown in FIGS. 2 and 3 for clarity.

The second device 106 of FIGS. 1 and 2 and the third device 108 can have a similar or different partition as the first device 102. The functional units in the second device 106 can work individually and independently of the other functional units of the second device 106. The functional units of the third device 108 can work individually and independently of the other functional units of the third device 108. The functional units of the first device 102 can work individually and independently of the other functional units of the first device 102.

The second device 106 can work individually and independently from the first device 102, the third device 108, and the communication path 104. The third device 108 can work individually and independently from the first device 102, the second device 106, and the communication path 104. The first device 102 can work individually and independently from the second device 106, the third device 108, and the communication path 104.

For illustrative purposes, the computing system 100 is described by operation of the first device 102, the second device 106, and the third device 108. It is understood that the first device 102, the second device 106, and the third device 108 can operate any of the modules, units, and functions of the computing system 100.

Figure 4:
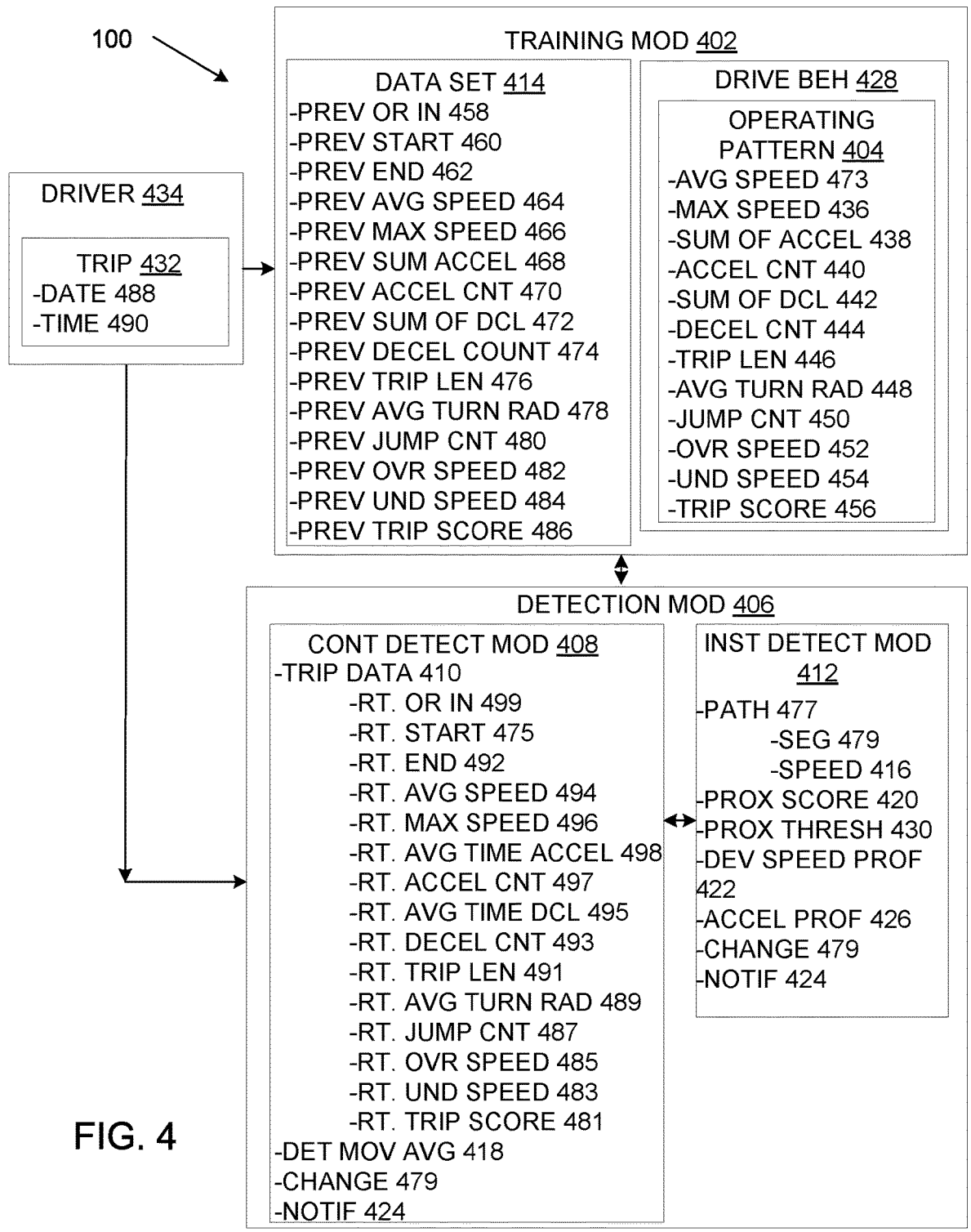
FIG. 4 is an exemplary control flow of the computing system in an embodiment of the present invention.

Referring now to FIG. 4, therein is shown an exemplary control flow of the computing system 100 in an embodiment of the present invention. In one embodiment the computing system 100 can function in two phases. A training phase, implemented by a training module 402, and a detection phase, implemented by a detection module 406. In one embodiment, the detection phase or the detection module 406 can be further divided into two sub-phases, including a continuous detection phase, implemented by a continuous detection module 408, and an instantaneous detection phase, implemented by an instantaneous detection module 412. The detection module 406 can include the continuous detection module 408 and the instantaneous detection module 412. In one embodiment, the continuous detection module 408 and the instantaneous detection module 412 can work in conjunction to identify changes in a driving behavior 428 of a driver 434 of the vehicle 110 of FIG. 1.

The training module 402 enables the mode of operation of the computing system 100 where the computing system 100 is taught to identify the driving behavior 428 of the driver 434 of the vehicle 110, of FIG. 1. The driver 434 refers to the operator of the vehicle 110. The driving behavior 428 refers to the manner in which the driver 434 operates the vehicle 110. In one embodiment, the computing system 100 can be taught to identify the driving behavior 428 based on generating an operating pattern 404 of the driver 434. The operating pattern 404 can be represented by one or more variables, parameters, vectors, clusters of data, or a combination thereof, and can indicate a quantitative representation of the manner in which the driver 434 operates the vehicle 110.

As an example, the operating pattern 404 can include variables, parameters, vectors, clusters of data, or a combination thereof, representing an average speed 473, a maximum speed 436, an sum of acceleration force values 438, an acceleration count 440, an sum of deceleration force values 442, a deceleration count 444, a trip length 446, an average turning radius 448, a jumping count 450, an over speeding count 452, an under speeding count 454, a trip score 456, an under speeding score, an over speeding score, or a combination thereof. A trip 432 refers to one instance where the vehicle's 110 ignition is turned on and subsequently turned off.

The training module 402 can enable the identification of the driving behavior 428 in a number of ways. For example, the training module 402 can implement a machine learning mechanism or approach, or a deep learning mechanism or approach to identify the driving behavior 428. Examples of machine learning can include supervised or unsupervised machine learning mechanisms. The machine learning or deep learning mechanisms can use a data set 414, from which the computing system 100 can generate the operating pattern 404 to identify the driving behavior 428. Further details of the machine learning mechanism or deep learning mechanism will be discussed below.

The data set 414 refers to a collection of related information that includes separate elements that can be represented as a whole. The data set 414 can represent one or more variables or parameters of operational information of the vehicle 110 associated with the driving behavior 428. The data set 414 can be based on a number of trips 432 that the driver 434 has made prior to a date 488 and a time 490. In one embodiment, the variables and parameters of the data set 414 can include, for example, a previous origin indicator 458, a previous trip start time 460, a previous trip end time 462, a previous average speed 464, a previous maximum speed 466, a previous sum of acceleration force values 468, a previous acceleration count 470, a previous sum of deceleration force values 472, a previous deceleration count 474, a previous trip length 476, a previous average turning radius 478, a previous jumping count 480, a previous over speeding count 482, a previous under speeding count 484, a previous trip score 486, a previous under speeding score, a previous over speeding score, or a combination thereof.

In one embodiment, one or more variables or parameters of the data set 414 can be obtained from the vehicle 110 of FIG. 1, by the first device 102, the second device 106, the third device 108, or a combination thereof. As another example, the one or more variables or parameters of the data set 414 can also be obtained from one or more of the functional units of the first device 102, the second device 106, or the third device 108, such as the first location unit 214, the second location unit 246, the third location unit 326, or a combination thereof, which in conjunction with the first control unit 210, second control unit 238, third control unit 318, or a combination thereof, can obtain, determine, set the value of, or compute the one or more variables or parameters of the data set 414. As an example, in one embodiment, the first location unit 214, the second location unit 246, the third location unit 326, or a combination thereof, in conjunction with the first control unit 210, second control unit 238, third control unit 318, or a combination thereof, can obtain, determine, set the value of, or compute the previous trip start time 460, the previous trip end time 462, the previous average speed 464, or the other variables or parameters of the data set 414. The first location unit 214, the second location unit 246, the third location unit 326, or a combination thereof can, for example, calculate the previous average speed 464 by obtaining speed readings or samples from the vehicle 110 computer at intervals during the trip 432 and averaging the speed over the previous trip length 476, which represents the total length of the trip 432 by the driver 434.

In one embodiment, the data set 414 can be stored in the first storage unit 216, the second storage unit 240, the third storage unit 320, or a combination thereof. In another embodiment, the data set 414 can be stored in storage external to the first storage unit 216, the second storage unit 240, or the third storage unit 320. Further details regarding the training stage and the training module 402 will be discussed below.

Once generated by the training module 402, the operating pattern 404 can optionally be used by the detection module 406. The detection module 406 enables a mode of operation of the computing system 100 where the computing system 100 can identify a change 479 in the driving behavior 428. The change 479 refers to a deviation from an expected value of the operating pattern 404.

The detection module 406 can be further divided into two sub-modules. In one embodiment, these can include the continuous detection module 408 and the instantaneous detection module 412. In one embodiment, the continuous detection module 408 can enable the identification of the change 479 in the driving behavior 428 based on detecting differences between a trip data 410 and the operating pattern 404 over time 490. The instantaneous detection module 412 can enable the identification of the change 479 in the driving behavior 428 from one trip 432 to the next trip 432. The detection module 406 can toggle between the continuous detection module 408 and the instantaneous detection module 412 depending on which type of identification is desired. In one embodiment, the instantaneous detection module 412 can also be used in conjunction with the continuous detection module 408 to identify the change 479 in the driving behavior 428. In one embodiment, the instantaneous detection module 412 can further be used in conjunction with the training module 402 to identify the change 479 in the driving behavior 428.

In one embodiment, if it is desired to identify a change 479 in the driving behavior 428 over time 490, the detection module 406 can enable the functioning of the continuous detection module 408. In one embodiment, the continuous detection module 408 can identify the change 479 in the driving behavior 428 based on identifying the driver 434, generating a detection moving average 418 of a trip data 410 over two or more trips 432 for the driver 434, and comparing the operating pattern 404 to the detection moving average 418 to determine whether the detection moving average 418 falls within a range of values, parameters, vectors, clusters of data, or a combination thereof of the operating pattern 404 for the driver 434. If the continuous detection module 408 determines that the detection moving average 418 is within the range of values, parameters, vectors, clusters of data, or a combination thereof of the operating pattern 404, the continuous detection module 408 can determine that there is no change 479 in the driving behavior 428. If the continuous detection module 408 determines that the detection moving average 418 falls outside the range of values, parameters, vectors, clusters of data, or a combination thereof of the operating pattern 404, the continuous detection module 408 can determine the change 479 in the driving behavior 428 has occurred, and the continuous detection module 408 can further generate a notification 424 that the change 479 is detected.

The notification 424 can be a visual or audible message, an indicator, a signal, a numerical code, or a combination thereof. In one embodiment, the detection module 406 can generate the notification 424 for presentation by the first user interface 254, the second user interface 228, the third user interface 310, or a combination thereof.

The detection moving average 418 refers to a moving average of the trip data 410 over two or more trips 432. A moving average refers to a succession of averages derived from successive segments over time 490 of a series of values. The detection moving average 418 can be used to determine long term trends in the trip data 410 and can be compared to the operating pattern 404 to identify a change 479 in the driving behavior 428 over time 490. The detection moving average 418 can be determined by any techniques or formulas used to determine moving averages.

The trip data 410 refers to variables or parameters associated with the vehicle 110 real time operations after the date 488 and the time 490 when the operating pattern 404 is generated. Real time refers to the actual time 490 during which the trip 432 occurs after the date 488 and the time 490 when the operating pattern 404 is generated. For example, once the training module 402 completes its operation, and the operating pattern 404 has been generated, any trips 432 after that which generate the variables or parameters associated with the vehicle 110 real time operations during the trip 432 can constitute the trip data 410.

In one embodiment, the variables and parameters of the trip data 410 can include, for example, a real time origin indicator 499, a real time trip start time 475, a real time trip end time 492, a real time average speed 494, a real time maximum speed 496, a real time sum of acceleration force values 498, a real time acceleration count 497, a real time sum of deceleration force values 495, a real time deceleration count 493, a real time trip length 491, a real time average turning radius 489, a real time jumping count 487, a real time over speeding count 485, a real time under speeding count 483, a real time trip score 481, or a combination thereof.

In one embodiment, the trip data 410 can be obtained from the vehicle 110 by the first device 102, the second device 106, the third device 108, or a combination thereof. As another example, the trip data 410 can also be obtained from one or more of the functional units of the first device 102, the second device 106, or the third device 108, such as the first location unit 214, the second location unit 246, the third location unit 326, or a combination thereof, which in conjunction with the first control unit 210, second control unit 238, third control unit 318, or a combination thereof, can obtain, determine, set the value of, or compute the one or more variables or parameters that comprise the trip data 410. For example, in one embodiment, the first location unit 214, the second location unit 246, the third location unit 326, or a combination thereof, in conjunction with the first control unit 210, second control unit 238, third control unit 318, or a combination thereof, can obtain, determine, set the value of, or compute the real time trip start time 475, the real time trip end time 492, the real time average speed 494, or any of the other variables or parameters of the trip data 410. The first location unit 214, the second location unit 246, the third location unit 326, or a combination thereof can, for example, calculate the real time average speed 494 by obtaining speed readings or samples from the vehicle 110 computer at intervals during the trip 432 and averaging the speed over the real time trip length 491, which represents the total length of the trip 432 by the driver 434.

In one embodiment, the trip data 410 can be stored in the first storage unit 216, the second storage unit 240, the third storage unit 320, or a combination thereof. In another embodiment, the trip data 410 can be stored in storage external to the first storage unit 216, the second storage unit 240, or the third storage unit 320.

In another embodiment, if it is desired to identify the change 479 in the driving behavior 428 from one trip 432 to the next trip 432, the detection module 406 can enable the operation of the instantaneous detection module 412. The instantaneous detection module 412 can identify a change 479 in the driving behavior 428 from one trip 432 to the next trip 432 in a number of ways. For example, in one embodiment, the instantaneous detection module 412 can identify the change 479 in the driving behavior 428 from one trip 432 to the next trip 432 by comparing one or more variables or parameters of the trip data 410, the data set 414, or a combination thereof, for consecutive trips 432. For example, in one embodiment, the instantaneous detection module 412 can compare the real time average speed 494 during one trip 432, to a known speed limit 416 for one or more segments 479 of paths 477 traversed during the trip 432, and the real time average speed 494 during the next trip 432, to the known speed limit 416 for one or more segments 479 of paths 477 traversed during the next trip 432.

In another embodiment, the instantaneous detection module 412 can compare the previous average speed 464 during one trip 432, to a known speed limit 416 for one or more segments 479 of paths 477 traversed during the trip 432, and the previous average speed 464 during the next trip 432, to the known speed limit 416 for one or more segments 479 of paths 477 traversed during the next trip 432.

In one embodiment, the known speed limit 416 can be stored in the first storage unit 216, the second storage unit 240, the third storage unit 320, or a combination thereof. In another embodiment, the known speed limit 416 can be stored in an external source, external to the first storage unit 216, the second storage unit 240, or the third storage unit 320 and can be obtained by the computing system 100 via the communication path 104 in conjunction with the first communication unit 202, the second communication unit 226, the third communication unit 306, or a combination thereof. Such external sources can be, for example, sources such as Google™ snap-to-road and speed limit APIs.

Continuing with the example, to facilitate the comparison, the instantaneous detection module 412 can, in one embodiment, generate a deviation speed profile 422 based on the real time average speed 494 or previous average speed 464, and the known speed limit 416 for one or more segments 479 of paths 477 traversed during the trip 432 and the deviation speed profile 422 based on the real time average speed 494 or previous average speed 464, and the known speed limit 416 for one or more segments 479 of paths 477 traversed during the next trip 432.

The deviation speed profile 422 can be a variable, parameter, vector, or a combination thereof, and can represent the differences between the real time average speed 494 or the previous average speed 464, and the known speed limit 416 along the one or more segments 479 of paths 477 traversed. Based on the deviation speed profile 422 for consecutive trips 432, the instantaneous detection module 412 can calculate a proximity score 420, which can be a variable or parameter representing the closeness between the deviation speed profile 422 for each of the consecutive trips 432. The proximity score 420 can, in one embodiment, be calculated based on the sum of the square of point-wise differences between the deviation speed profile 422 of the consecutive trips 432.

In one embodiment, the instantaneous detection module 412 can compare the proximity score 420 to a proximity threshold value 430. The proximity threshold value 430 refers to a variable or parameter which, if the proximity score 420 value surpasses, can indicate that a change in driving behavior 428 has occurred. The proximity threshold value 430 can be a preset value. In one embodiment, if the proximity score 420 is less than or equal to the proximity threshold value 430, the instantaneous detection module 412 can determine that there is no change in the driving behavior 428. If the proximity score 420 is greater than the proximity threshold value 430, the instantaneous detection module 412 can determine that there is a change in the driving behavior 428, and can further generate the notification 424.

In another embodiment, the instantaneous detection module 412 can identify a change 479 in the driving behavior 428 by, for example, comparing the real time sum of acceleration force values 498 or the previous sum of acceleration force values 468, for consecutive trips 432. The real time sum of acceleration force values 498 or the previous sum of acceleration force values 468 can represent the time 490 it takes for the driver 434 to accelerate from a stopped position to a threshold speed. The instantaneous detection module 412 can generate an acceleration-based profile 426 based on the real time sum of acceleration force values 498 or the previous sum of acceleration force values 468. In one embodiment, the acceleration-based profile 426 can be based on the real time sum of acceleration force values 498 or the previous sum of acceleration force values 468 for consecutive trips 432. The acceleration-based profile 426 can be a variable, parameter, vector, or a combination thereof, and can represent the differences between the real time sum of acceleration force values 498 or the previous sum of acceleration force values 468 for consecutive trips 432.

Based on the acceleration-based profile 426, the instantaneous detection module 412 can calculate the proximity score 420 between the acceleration-based profile 426 for each of the consecutive trips 432. Similar to what was described above, the proximity score 420 can be calculated based on the sum of the square of point-wise differences between the acceleration-based profile 426 for each of the consecutive trips 432.

In one embodiment, the instantaneous detection module 412 can compare the proximity score 420 to the proximity threshold value 430, and if the proximity score 420 is less than or equal to the proximity threshold value 430, the instantaneous detection module 412 can determine there is no change 479 in the driving behavior 428. If the proximity score 420 is greater than the proximity threshold value 430, the instantaneous detection module 412 can determine that there is a change 479 in the driving behavior 428, and can further generate the notification 424.

In one embodiment the instantaneous detection module 412 can further be used during the training phase, by the training module 402, to identify the change 479 in driving behavior 428. For example, the training module 402 can use the instantaneous detection module 412 as described above to determine whether the driver 434 of the vehicle 110 has changed from one trip 432 to the next trip 432 based on the proximity score 420. For example, in one embodiment, if the proximity score 420 is greater than the proximity threshold value 430 the training module 402 can determine that the driving behavior 428 has changed and can further process the data set 414 accordingly based on the change in the driver 434.

Figure 5:
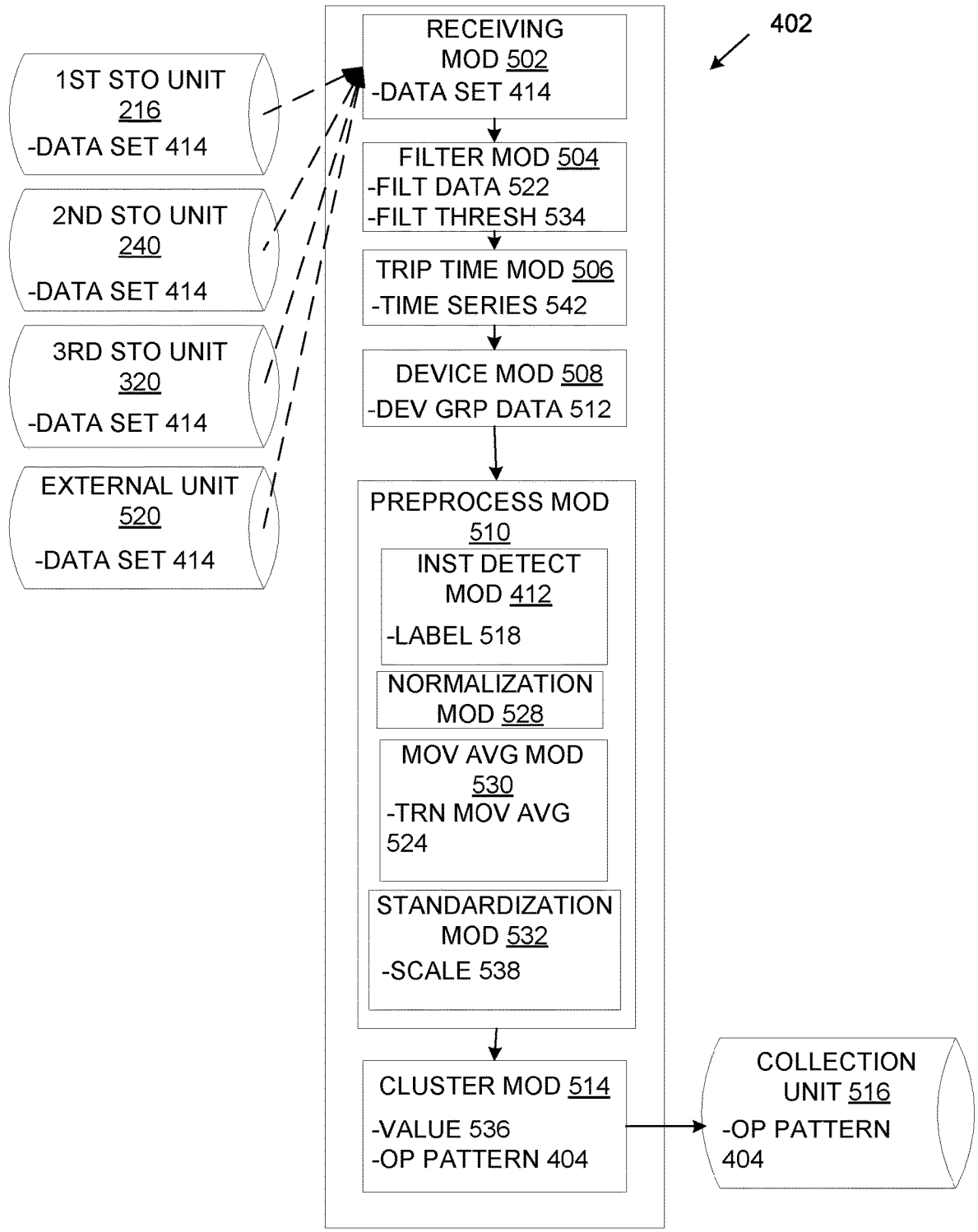
FIG. 5 is an exemplary control flow of a training module of the computing system in an embodiment of the present invention.

Referring now to FIG. 5, therein is shown an exemplary control flow of the training module 402 of the computing system 100 in an embodiment of the present invention. The training module 402 and the sub-modules thereof, as will be described further below, can implement the machine learning mechanism or the deep learning mechanism. In one embodiment, the training module 402 can include a receiving module 502, a filter module 504, a trip time module 506, a device module 508, a preprocessing module 510, and a clustering module 514. In one embodiment, the receiving module 502 can be coupled to the filter module 504. The filter module 504 can be coupled to the trip time module 506. The trip time module 506 can be coupled to the device module 508. The device module 508 can be coupled to the preprocessing module 510. The preprocessing module 510 can be coupled to the clustering module 514.

The receiving module 502 can enable the receiving of the data set 414 from one or more storage locations. For example, in one embodiment, the receiving module 502 can receive the data set 414 from the first storage unit 216, the second storage unit 240, the third storage unit 320, or a combination thereof. In another embodiment, the receiving module 502 can receive the data set 414 from an external storage, for example an external unit 520. The external unit 520 can be external to the first device 102, second device 106, or the third device 108. The receiving module 502 can receive the data set 414 through the communication path 104 and the first communication unit 202, the second communication unit 226, the third communication unit 306, or a combination thereof.

The external unit 520, similar to the first storage unit 216, the second storage unit 240, and the third storage unit 320, can be a volatile memory, a nonvolatile memory, an internal memory, an external memory, or a combination thereof. For example, the external unit 520 can be a nonvolatile storage such as non-volatile random access memory (NVRAM), Flash memory, disk storage, or a volatile storage such as static random access memory (SRAM). In another embodiment, the external unit 520 can be a database or a lookup table.

Continuing with the example, in one embodiment, once the data set 414 is received, the receiving module 502 can pass control and the data set 414 to the filter module 504. The filter module 504 can enable the removal of instances of the data set 414. As a result, a filtered data set 522 is obtained. The filtered data set 522 represents the data set 414 after instances of the data set 414 have been removed.

For example, in one embodiment, the filtered data set 522 can be obtained based on the filter module 504 filtering some or all of the variables and parameters of the data set 414 based on the data set 410 being below a filter threshold value 534. The filter threshold value 534 is a variable or parameter which acts as a filter for instances of the data set 414 that do not meet a certain baseline. For example, in one embodiment, if the filter threshold value 534 is set to a minimum distance such that any trip data 410 below that distance is to be filtered, and the instance of the data set 414 indicates, for example by the value of the previous trip length 476, that the trip 432 was below the value of the filter threshold value 534, the filter module 504 can filter out the instance of the data set 414 and disregard its value.

It has been discovered that the filtering of the data set 414 improves the ability of the computing system 100 to generate the operating pattern 404 because it removes potential outlying data that can create biases, distortions, erroneous ranges or values, or a combination thereof, that would otherwise impair or distort the ability of the computing system 100 to generate the operating pattern 404.

Continuing with the example, in one embodiment, once the data set 410 is filtered, control and the filtered data set 522 can be passed to the trip time module 506. The trip time module 506 can enable the sorting of the filtered data set 522 by the previous trip start time 460 of FIG. 4, the previous trip end time 462 of FIG. 4, or a combination thereof. In this way, the trip time module 506 can chronologically order the filtered data set 522 and generate a time series 542 of the filtered data set 522 which can be used to determine a training moving average 524 of the filtered data set 522. Details of the training moving average 524 will be discussed further below. The time series 542 refers to a series of values of a quantity obtained at successive times 490, often with equal intervals between them.

In one embodiment, once the filtered data set 522 is sorted by the trip time module 506, the filtered data set 522 and control can pass to the device module 508. The device module 508 can enable the grouping of the filtered data set 522 based on where the instances of the filtered data set 522 originated from. For example, in one embodiment, the device module 508 can enable the grouping of instances of the filtered data set 522 by looking at the value of the previous origin indicator 458 of FIG. 4. The previous origin indicator 458 refers to a variable or parameter that indicates where the instance of the filtered data set 522 originated from. The previous origin indicator 458 can be set or assigned by the first device 102, the second device 106, the third device 108, or the vehicle 110, at the time 490 when the instance of the data set 414 is obtained from the first device 102, the second device 106, the third device 108, or the vehicle 110 of FIG. 1.

For example, in one embodiment, when the instance of the data set 414 is obtained from, for example, the first device 102 of FIG. 1, the previous origin indicator 458 can be set to a value, for example, "DEVICE 1," which can be associated with the first device 102, and indicate that the instance of the data set 414 came from the first device 102. As another example, when the instance of the data set 414 is obtained from, for example, the vehicle 110, the previous origin indicator 458 can be set to a value, for example, "VEHICLE 1," which can be associated with the vehicle 110, and indicate that the instance of the data set 414 came from the vehicle 110. The grouping of the filtered data set 522 results in the generation of a device group data 512. The device group data 512 refers to a grouping or cluster of the filtered data set 522, where instances of the filtered data set 522 originating from the same device or vehicle 110 are grouped or clustered together.

It has been discovered that the grouping or clustering of instances of the filtered data set 522 into the device group data 512 allows the training module 402 to consider data originating from the same devices or the same vehicle 110 together. By considering data originating from the same devices or the same vehicle 110 together, the training module 402 can prevent the generation of the operating pattern 404 for the driver 434 based on data originating from other devices or other vehicles 110 that are potentially not related to the driver 434. In this way, the computing system 100 can generate the operating pattern 404 for the driver 434 based on data that most likely originated from the driver 434.

In one embodiment, once the filtered data set 522 is grouped by the device module 508, the device group data 512 and control can pass to the preprocessing module 510. The preprocessing module 510 can enable the processing of the device group data 512 to a form that can be used to generate the operating pattern 404. In one embodiment, the preprocessing module 510 can further include one or more sub-modules. For example, in one embodiment, these can include the instantaneous detection module 412 of FIG. 4, a normalization module 528, a moving average module 530, and a standardization module 532.

The instantaneous detection module 412 can be implemented using the same functions and processes as described with respect to FIG. 4. In the embodiment with respect to this FIG. 5, the instantaneous detection module 412 can further enable the labeling of the device group data 512 in order to associate the instances of the device group data 512 with the driver 434. The labeling can be implemented by generating a label 518, which can be a variable or parameter indicating the driver 434 as being associated to the instance of the device group data 512.

As an example, in one embodiment, the instantaneous detection module 412 can process the instances of the device group data 512 and determine whether the instances indicate a change 479 in the driving behavior 428 from one trip 432 to the next trip 432 similar to what was described with respect to FIG. 4. If a change 479 is detected, the instantaneous detection module 412 can generate the label 518 indicating the instance of the device group data 512 is either associated with the driver 434 or not. For example, in one embodiment, the instantaneous detection module 412 can be preset to have the instances of the device group data 512 be associated with a default driver 434 for the devices or vehicle 110 from which the instance of the device group data 512 originates from. However, if while processing the device group data 512, the instantaneous detection module 412 detects a change 479 in the driving behavior 428, the instantaneous detection module 412 can generate the label 518 indicating that the instance of the device group data 512 is not associated with the default driver 434. In this way, the instantaneous detection module 412 can further group the instances of the device group data 512 to generate the operating pattern 404 based on the device group data 512 most likely originating from the driver 434.

In one embodiment, once the instantaneous detection module 412 completes its labeling, the labeled device group data 512 and control can be passed to the normalization module 528. The normalization module 528 can enable the normalization of the device group data 512. Normalization refers to the process of adjusting the values or parameters of the instances of the device group data 512 which are measured on different scales, to a notionally common scale. The normalization allows the training module 402 to compare the instances of the device group data 512 with one another by using the same baseline value to compare instances of the device group data 512. For example, in one embodiment, the normalization module 528 can enable the normalization of the device group data 512 based on the previous trip length 476, by dividing the variables and parameters of the device group data 512 by the previous trip length 476, such that all of the variables and parameters of the device group data 512 can be compared based on the previous trip length 476.

In one embodiment, once the normalization module 528 completes the normalization, the normalized device group data 512 and control can be passed to the moving average module 530. The moving average module 530 can enable the generation of a training moving average 524. The training moving average 524 is a moving average of the instances of the device group data 512 over two or more trips 432. The training moving average 524 can be used to determine long term trends in the instances of the device group data 512, smooth out the device group data 512 by providing time series 512 average of expected values of the device group data 512, and can be used to generate the operating pattern 404 by indicating averages over time 490 of the driving behavior 428. For example, the moving average module 530 can generate the training moving average 524 by processing the instances of the device group data 512 and taking the moving average of the device group data 512 over the last two or more trips 432.

In one embodiment, once the moving average module 530 completes the generation of the training moving average 524, the training moving average 524 and control can pass to the standardization module 532. The standardization module 532 enables the standardization of the training moving average 524. Standardization refers to the process of rescaling the training moving average 524. For example, in one embodiment the standardization module 532 can rescale the training moving average 524 to generate a scale 538 from [0, 1]. In another embodiment, the standardization module 532 can rescale the training moving average 524 to generate a scale 538 from [−1, 1].

The rescaling can enable the adjustment of the training moving average 524 such that instances of the training moving average 524 can be compared to one another based on the scale 538. For example, in one embodiment, because the training moving average 524 consists of instances of the device group data 512, if two or more variables and parameters that make up the training moving average 524 are to be compared, for example the training moving average 524 associated with the previous acceleration count 470 and the previous deceleration count 474, the standardization module 532 can generate the scale 538 of the training moving average 524 such that these two variables or parameters can be compared against one another. In this way, variables with different ranges can be compared to one another and can be mapped, grouped, or clustered together.

In one embodiment, once the standardization module 532 completes the rescaling of the training moving average 524, the rescaled training moving average 524 and control can be passed to the clustering module 514. The clustering module 514 enables the generation of the operating pattern 404 by processing the training moving average 524 using a clustering mechanism to group the training moving average 524 into clusters or groups that define the operating pattern 404. For example, the clustering module 514 can implement a clustering mechanism including, K-Means Clustering, Mean-Shift Clustering, Density-Based Spatial Clustering of Applications with Noise (DBSCAN), Expectation-Maximization (EM) Clustering using Gaussian Mixture Models (GMM), Agglomerative Hierarchical Clustering, or other clustering techniques to generate the clusters or groups.

As an example, in an embodiment where the clustering module 514 clusters or groups the training moving average 524 using a K-Means Clustering, the clustering module 514 can define clusters or groups indicating whether the instances of the training moving average 524 belong to the driver 434 or not. The clustering module 514 can do so by randomly choosing one or more clustering values 536 within the range of values of the training moving average 524 and can define groups or clusters indicating whether instances of the training moving average 524 belong to the driver 434 or not based on the clustering values 536. The clustering module 514 can then map the instances of the training moving average 524 against the clustering values 536.

Once all the instances of device group data 512 are mapped, the clustering module 514 can re-calculate the clustering values 536 by re-setting the clustering values 536 to be the average of the Euclidean distance of the instances of the training moving average 524 from the original value of the clustering value 536 that falls within a cluster or group. The clustering module 514 can redefine the groups or clusters based on the recalculated clustering values 536. The clustering module 514 can reprocess the instances of the training moving average 524 to determine where they fall with respect to the recalculated clustering values 536. The clustering module 514 can repeat the process until the clustering values 536 do not change. Once the clustering values 536 do not change, the clusters or groups that result define the operating pattern 404. Thus, the computing system 100 can determine that values of data that fall within the one or more clusters or groups either belong to the driver 434 or not.

In one embodiment, the operating pattern 404 can be stored in a collection unit 516. The collection unit 516, is storage similar to the first storage unit 216, the second storage unit 240, the third storage unit 320, and the external unit 520, and can be a volatile memory, a nonvolatile memory, an internal memory, an external memory, or a combination thereof. In one embodiment, the operating pattern 404 can be used to identify the change 479 in the driving behavior 428.

Figure 6:
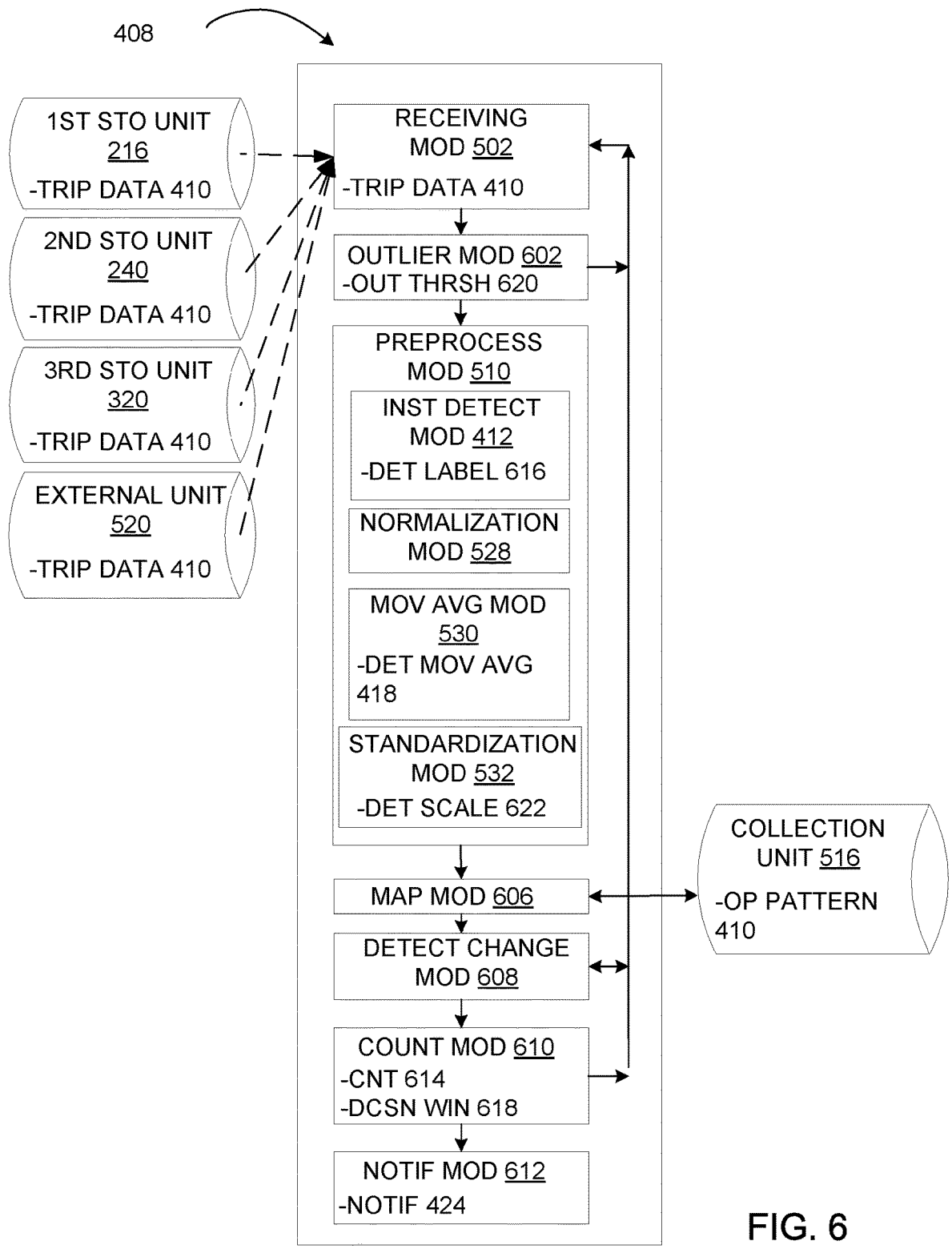
FIG. 6 is an exemplary control flow of a continuous detection module of a detection module in an embodiment of the present invention.

Referring now to FIG. 6, therein is shown an exemplary control flow of the continuous detection module 408 of the detection module 406 in an embodiment of the present invention. In one embodiment, the continuous detection module 408 can include the receiving module 502, an outlier module 602, the preprocessing module 510, a map module 606, a detect change module 608, a count module 610, and a notification module 612.

In one embodiment, the receiving module 502 can be coupled to the outlier module 602. The outlier module 602 can be coupled to the preprocessing module 510. The preprocessing module 510 can be coupled to the map module 606. The map module 606 can be coupled to the detect change module 608. The detect change module 608 can be coupled to the count module 610. The count module 610 can be coupled to the notification module 612.

The receiving module 502, using similar processes and techniques as was described with respect to the embodiment in FIG. 5, can enable the receiving of the trip data 410 from one or more storage locations. For example, in one embodiment, the receiving module 502 can enable the receipt of the trip data 410 from the first storage unit 216, the second storage unit 240, the third storage unit 320, or a combination thereof. In another embodiment, the receiving module 502 can receive the trip data 410 from the external unit 520. The receiving module 502 can receive the trip data 410 through the communication path 104 and the first communication unit 202, the second communication unit 226, the third communication unit 306, or a combination thereof.

In one embodiment, once received, the receiving module 502 can pass control and the trip data 410 to the outlier module 602. The outlier module can determine whether the trip data 410 received should be removed or further processed based on the trip data 410 being below an outlier threshold value 620. The outlier threshold value 620 is a variable or parameter which acts as a filter for instances of the trip data 410 that do not meet a certain baseline. As an example, in one embodiment, the outlier module 602 can be configured to discard the trip data 410 if, for example, the instance of the trip data 410 is below the value of the outlier threshold value 620. For example, in one embodiment, if the outlier threshold value 620 is set to a certain distance such that if the instance of the trip data 410, as indicated by, for example, the real time trip length 491, is below the outlier threshold value 620, the outlier module 602 can determine that the instance of the trip data 410 should be discarded.

In one embodiment, if the outlier module 602 determines that the trip data 410 should be discarded, the detection module 406 can stop processing the trip data 410, discard the trip data 410, and can pass control to the receiving module 502 to wait for further trip data 410 to process. If the outlier module 602 determines that the trip data 410 should be further processed because, for example, the instance of the trip data 410 is equal to or greater than the outlier threshold value 620, for example, the trip 432 is equal to or above a certain distance, control and the trip data 410 can be passed to the preprocessing module 510.

The preprocessing module 510 as implemented in this embodiment shown in FIG. 6 can have the same functionality as was described with respect to FIG. 5. The preprocessing module 510 can enable the processing of the trip data 410 to a form that can be used to identify a change 479 in the driving behavior 428. In one embodiment, the preprocessing module 510 can further include one or more sub-modules. For example, in one embodiment, these can include the instantaneous detection module 412 of FIG. 4, the normalization module 528 of FIG. 5, the moving average module 530 of FIG. 5, and the standardization module 532 of FIG. 5.

The instantaneous detection module 412 can be implemented using the same functions and processes as described with respect to FIGS. 4 and 5. The instantaneous detection module 412, similar to what was described with respect to FIG. 5, can further enable the labeling of the trip data 410 in order to associate the instances of the trip data 410 with the driver 434. The labeling can be implemented by generating a detection label 616, which can be a variable or parameter indicating the driver 434 as being associated with the instance of the trip data 410.

As an example, in one embodiment, the instantaneous detection module 412 can process the instance of the trip data 410 and determine whether the instance indicates a change 479 in the driving behavior 428 from one trip 432 to the next trip 432 as was described with respect to FIG. 4. If a change 479 is detected, the instantaneous detection module 412 can generate the detection label 616 indicating the instance of the trip data 410 is associated with the driver 434 or not. For example, in one embodiment, the instantaneous detection module 412 can be preset to have the instance of the trip data 410 be associated with a default driver 434 for the devices or vehicle 110 from which the instance of the trip data 410 originates from. If while processing the trip data 410, the instantaneous detection module 412 detects the change 479 in the driving behavior 428, the instantaneous detection module 412 can generate the detection label 616 indicating that the instance of the trip data 410 is not associated with the default driver 434. In this way, the instantaneous detection module 412 can group the trip data 410 based on data most likely originating from the driver 434.

In one embodiment, once the instantaneous detection module 412 completes its labeling, the labeled trip data 410 and control can be passed to the normalization module 528. The normalization module 528, similar to what was described with respect to FIG. 5, can enable the normalization of the trip data 410. Normalization refers to the process of adjusting the values or parameters of the instances of the trip data 410 which are measured on different scales, to a notionally common scale. The normalization allows the continuous detection module 408 to compare the instances of the trip data 410 with one another by using the same baseline value to compare instances of the trip data 410. For example, in one embodiment, the normalization module 528 can enable the normalization of the trip data 410 based on the real time trip length 491, by dividing the variables and parameters of the trip data 410 by the real time trip length 491, such that all of the variables and parameters of the trip data 410 can be compared based on the real time trip length 491.

In one embodiment, once the normalization module 528 completes the normalization, the normalized trip data 410 and control can be passed to the moving average module 530. The moving average module 530, similar to what was described with respect to FIG. 5, can enable the generation of the detection moving average 418 of FIG. 4. The detection moving average 418 can be used to determine long term trends in the instances of the trip data 410, smooth out the trip data 410 by providing a longer term average of expected values of the trip data 410, and can be used to identify changes 479 in the driving behavior 428 over time 490. For example, the moving average module 530 can generate the detection moving average 418 by processing the instances of the trip data 410 and taking the moving average of the trip data 410 over the last two or more trips 432.

In one embodiment, once the moving average module 530 completes the generation of the detection moving average 418, the detection moving average 418 and control can pass to the standardization module 532. The standardization module 532, similar to what was described with respect to FIG. 5, enables the standardization of the detection moving average 418. The standardization refers to the process of rescaling the detection moving average 418. For example, in one embodiment the standardization module 532 can enable the rescaling of the detection moving average 418 to generate a detection scale 622 from [0, 1]. In another embodiment, the standardization module 532 can enable the rescaling of the detection moving average 418 to generate a detection scale 622 from [−1, 1].

The rescaling can be used to adjust the detection moving average 418, such that instances of the detection moving average 418 can be compared to one another based on the detection scale 622. For example, in one embodiment, because the detection moving average 524 consists of instances of the trip data 410 over two or more trips 432, if two or more variables and parameters that make up the detection moving average 418 are to be compared, for example the detection moving average 418 associated with the real time acceleration count 497 and the real time deceleration count 493, the standardization module 532 can generate the detection scale 622 of the detection moving average 418 such that these two variables or parameters can be compared against one another. In this way, variables with different ranges can be compared to one another and can be mapped, grouped, or clustered together.

In one embodiment, once the standardization module 532 completes the rescaling of the detection moving average 418, the rescaled detection moving average 418 and control can be passed to the map module 606. The map module 606 can enable the mapping of the operating pattern 404 to the detection moving average 418. In one embodiment, the mapping can be based on the detection label 616 and the label 518. For example, in one embodiment, if the detection label 616 for the detection moving average 418 is associated with the driver 434, for example, "USER A," the operating pattern 404 associated with the corresponding label 518, for example, the label 518 corresponding to "USER A," is mapped to instance of the detection moving average 418 so that the two can be compared to identify a change 479 in the driving behavior 428. In one embodiment, the map module 606 can obtain the operating pattern 404 from the collection unit 516 through the communication path 104 and the first communication unit 202, the second communication unit 226, the third communication unit 306, or a combination thereof.

In one embodiment, once the map module 606 maps the operating pattern 404 to the detection moving average 418, control can pass to the detect change module 608. The detect change module 608 can enable the identification of a change 479 in the driving behavior 428. The detect change module 608 can identify the change 479 in the driving behavior 428 using the techniques and processes described with respect to FIG. 4.

For example, in one embodiment, the detect change module 608 can compare the detection moving average 418 to the operating pattern 404 over two or more trips 432, and determine whether the detection moving average 418, over two or more trips 432, falls within a range of values, parameters, vectors, clusters of data, or a combination thereof of the operating pattern 404. If after two or more trips 432 the detect change module 608 determines that the detection moving average 418 is within the range of values, parameters, vectors, clusters of data, or a combination thereof of the operating pattern 404 associated with the driver 434, the detect change module 608 can determine that there is no change 479 in the driving behavior 428. In that instance control can be passed to the receiving module 408, which can wait for further trip data 410 to process. If after two or more trips 432 the detect change module 608 determines that the detection moving average 418 falls outside the range of values, parameters, vectors, clusters of data, or a combination thereof of the operating pattern 404 associated with the driver 434, the detect change module 608 can determine that there is a change 479 in the driving behavior 428.

In one embodiment, the detect change module 608 can further look at specific instances of the detection moving average 418, for example the real time sum of acceleration force values 498, and based on the specific instance can determine whether a change 479 in the driving behavior 428 has occurred. For example, if the real time sum of acceleration force values 498 falls within or outside the range of values, parameters, vectors, clusters of data, or a combination thereof of the sum of acceleration force values 438 of the operating pattern 404 for the driver 434, the detect change module 608 can determine if the change 479 has occurred. For example, if the value of the detection moving average 418 after two or more trips 432 is within the range of values, parameters, vectors, clusters of data, or a combination thereof of the operating pattern 404 associated with the driver 434, the detection change module 608 can determine there is no change 479 in the driving behavior 428, at least with respect to the sum of acceleration force values 438, and can pass control to the receiving module 408, which can wait for further trip data 410 to process.

If the detect change module 608 determines that after two or more trips 432, the value of the detection moving average 418 is outside the range of values, parameters, vectors, clusters of data, or a combination thereof of the operating pattern 404 associated with the driver 434, the detect change module 608 can determine that there has been a change 479 in the driving behavior 428, at least with respect to the sum of acceleration force values 438 and can take further steps based on identifying the change 479. A similar process can be used to determine changes in the driving behavior 428 for other variables and parameters of the detection moving average 418. In one embodiment, if a change 479 is detected, control can pass to the count module 610.

The count module 610 can determine whether to pass control to the notification module 612 to generate the notification 424 of FIG. 4. The count module 610 can determine whether to pass control by implementing a count 614. The count 614 refers to a variable or parameter that can iteratively increase to reach the value of a decision window 618. The decision window 618 refers to a variable or parameter that can represent two or more trips 432 that follow the detection of a change 479 in the driving behavior 428. The decision window 618 can be a fixed value. For example, in one embodiment, the decision window 618 can be fixed to a value of two or more trips 432 after a change in the driving behavior 428 has been detected.

In one embodiment, the count module 610 can iteratively increase the count 614 once a change 479 in the driving behavior 428 has been detected, until the count 614 equals the value of the decision window 618. In one embodiment, once the value of the count 614 equals the value of the decision window 618, control can pass to the notification module 612 to generate the notification 424, and the count 614 can be reset.

The notification module 612 can enable the generation of the notification 424, as discussed previously with respect to FIG. 4. In one embodiment, the notification module 612 can enable the sending of the notification 424 for presentation by the first user interface 254, the second user interface 228, the third user interface 310, or a combination thereof. The notification module 612 can enable the sending of the notification 424 through the communication path 104 and the first communication unit 202, the second communication unit 226, the third communication unit 306, or a combination thereof. In another embodiment, the notification 424 can further include an audible noise or sound indicating the change 479. The audible noise or sound can be played on the first audio interface 204, the second audio interface 232, the third audio interface 312, or a combination thereof.

It has been discovered that the driver behavior detection mechanism and techniques for implementing the same as described herein provides improvements over existing technologies, because it allows for the use of both instantaneous and continuous detection a change 479 in the driving behavior 428. It has been further discovered that the ability to instantaneous and continuous detect the change 479 in the driving behavior 428 allows the computing system to more precisely detect the change 479 in the driving behavior 428 because the computing system 100 can do so based on short term and long term changes in the driving behavior 428 and as a result can better determine the driver's behavior based on short term and long term driving patterns.

It has been further discovered that the ability to instantaneously and continuously detect the change 479 in the driving behavior 428 allows the computing system 100 greater flexibility when generating the notification 424 of the change 479 in the driving behavior 428 because the computing system 100 can do so over short and long time 490 durations. It has been further discovered that the ability to generate the notification 424 over short and long time 490 durations and allows the driver 434 the ability to modify driving behavior 428 over short and long time 490 durations because the driver 434 can be aware of both short-term and long-term changes in the driving behavior 428.

It has been further discovered that the driving behavior detection mechanism and techniques for implementing the same as described herein provides for an ability to increase safety because it allows the driver 434, third parties, or a combination thereof to be notified of the change 479 in the driving behavior 428, which if determined to fall outside of standard or safe driving behavior 428 can be changed over short and long time 490 durations and allows the driver 434, third parties, or a combination thereof to take actions based on the notification 424. The actions can include changing the driving behavior 428 or providing incentives to change the driving behavior 428.

The computing system 100 has been described with module functions or order as an example. The computing system 100 can partition the modules differently or order the modules differently. For example, the first software 220, the second software 244, the third software 324, or a combination thereof, can include the modules for the computing system 100. As a specific example, the first software 220, the second software 244, the third software 324, or a combination thereof can include the training module 402, the detection module 406, the continuous detection module 408, the instantaneous detection module 412, the receiving module 502, the filter module 504, the trip time module 506, the device module 508, the preprocessing module 510, the clustering module 514, the outlier module 602, the map module 606, the detect change module 608, the count module 610, the notification module 612, and associated sub-modules included therein.

The first control unit 210, the second control unit 238, the third control unit 318, or a combination thereof, can execute the first software 220, the second software 244, the third software 324, or a combination thereof, to operate the modules. For example, the first control unit 210, the second control unit 238, the third control unit 318, or a combination thereof, can execute the first software 220, the second software 244, the third software 324, or a combination thereof, to implement the training module 402, the detection module 406, the continuous detection module 408, the instantaneous detection module 412, the receiving module 502, the filter module 504, the trip time module 506, the device module 508, the preprocessing module 510, the clustering module 514, the outlier module 602, the map module 606, the detect change module 608, the count module 610, the notification module 612, and associated sub-modules included therein.

The modules described in this application can be implemented as instructions stored on a non-transitory computer readable medium to be executed by the first control unit 210, the second control unit 238, the third control unit 318, or a combination thereof. The non-transitory computer readable medium can include the first storage unit 216, the second storage unit 240, the third storage unit 320, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 7A:
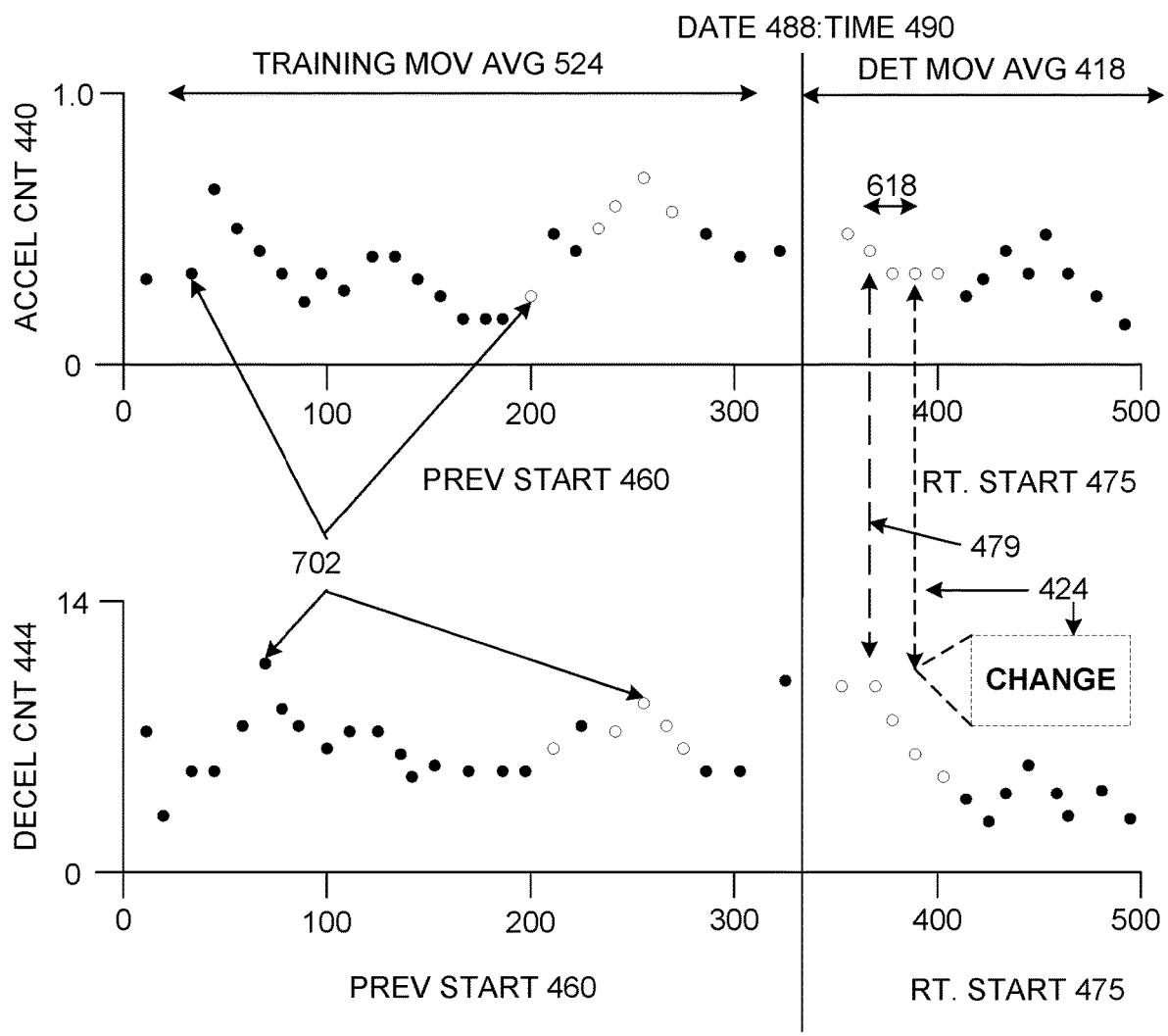
FIG. 7A is an exemplary graph indicating how the computing system can display a notification when a change in a driving behavior is detected in an embodiment of the present invention.

Referring now to FIG. 7A, therein is shown an exemplary graph indicating how the computing system 100 can display the notification 424 when a change 479 in the driving behavior 428 is detected in an embodiment of the present invention. In the embodiment shown in FIG. 7A, the graph indicates the training moving average 524 and the detection moving average 418, specifically for the variables or parameters of the acceleration count 440 and the deceleration count 444 over time 490. These are merely exemplary and other variables or parameters associated with the training moving average 524 and the detection moving average 418 can be used.

Continuing with the example, the graph further indicates one or more data points 702. The data points 702 can represent different clusters or groups of the training moving average 524 and the detection moving average 418, which are further associated the clusters or groups of the operating pattern 404. For example, FIG. 7A depicts data points 702 represented as black and white data points 702. The data points 702 indicate two clusters or groups of the operating pattern 404. For example, the black data points 702 can represent a cluster or group of the operating pattern 404 determined to be not associated with the driver 424. The white data points 702 can represent a cluster or group of data of the operating pattern 404 determined to be associated with the driver 424.

Continuing with the example, as shown in FIG. 7A, once the operating pattern 404 is determined, the computing system 100 can monitor the detection moving average 418 to determine a change 479 in the driving behavior 428. In the embodiment, shown in FIG. 7A the computing system 100 is shown as detecting the change 479 shortly after the detection moving average 418 is monitored. FIG. 7A further indicates that the computing system 100 generates the notification 424 after the decision window 618. In one embodiment, the graph of FIG. 7A and the notification 424 can be displayed on the first user interface 254, the second user interface 228, the third user interface 310, or a combination thereof.

Figure 7B:
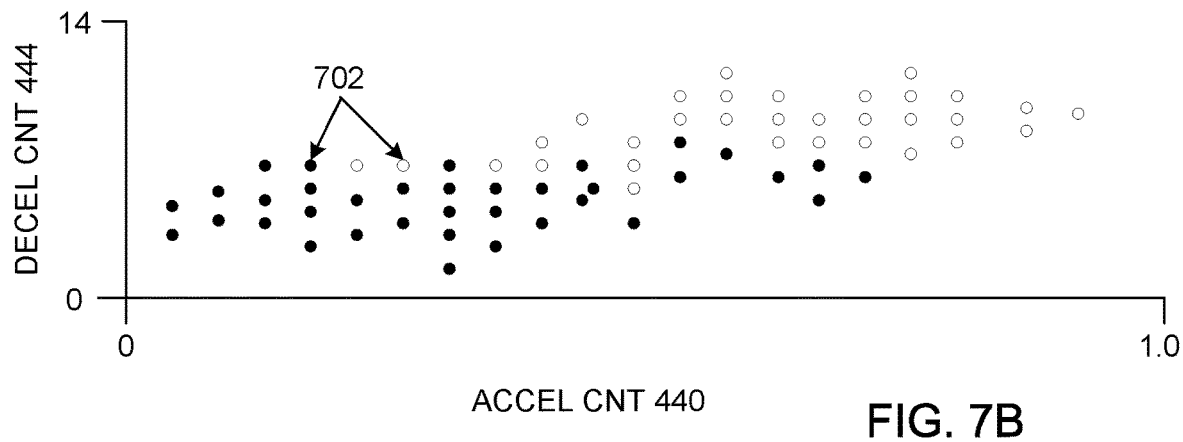
FIG. 7B is an exemplary graph showing the relationship between a training moving average and a detection moving average, specifically for an acceleration count and a deceleration count over time in an embodiment of the present invention.

Referring now to FIG. 7B, therein is shown an exemplary graph showing the relationship between the training moving average 524 and the detection moving average 418, specifically for the acceleration count 440 and the deceleration count 444 over time 490. In one embodiment, the graph in FIG. 7B can be further displayed in conjunction with the graph in FIG. 7A using the first user interface 254, the second user interface 228, the third user interface 310, or a combination thereof, to indicate the relationship between the acceleration count 440 and the deceleration count 444 over time 490, and to provide a further graphical depiction of the operating pattern 404 of the driver 424.

Figure 8:
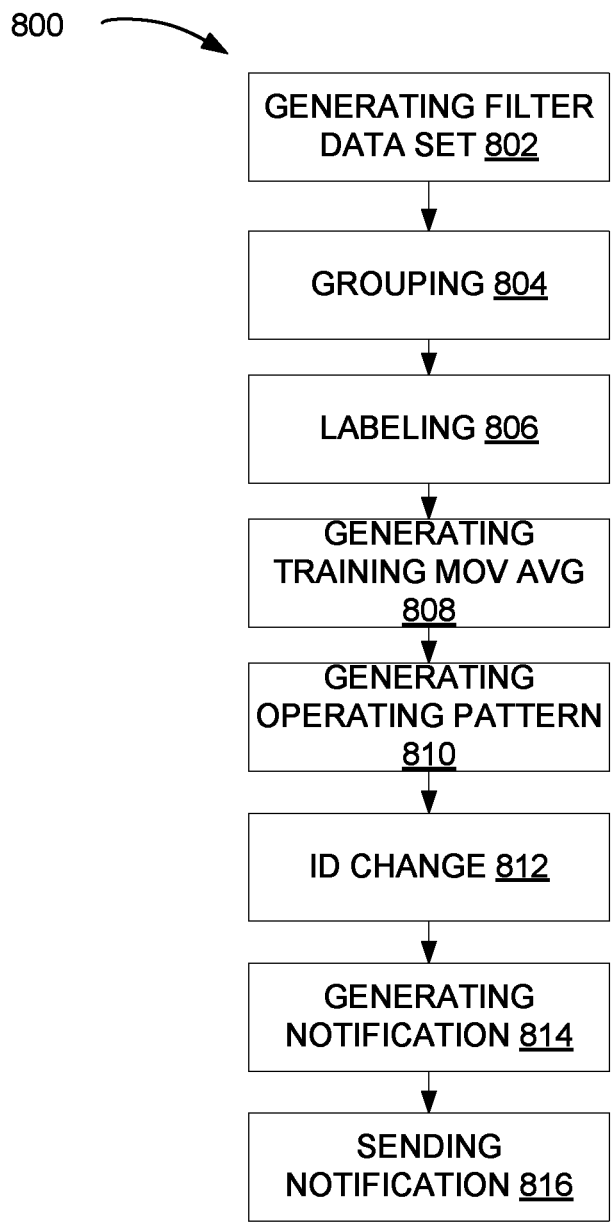
FIG. 8 is an exemplary method of operating the computing system in an embodiment of the present invention.

Referring now to FIG. 8, therein is shown a method 800 of operating the computing system 100 in an embodiment of the present invention. The method 800 includes: generating a filtered data set based on a data set, as shown in box 802; grouping the filtered data set based on a previous origin indicator to obtain a device group data, as shown in box 804; generating a label based on the device group data, as shown in box 806; generating a training moving average based on the label and the device group data, as shown in box 808; generating an operating pattern based on the training moving average, as shown in box 810; identifying a change in a driving behavior based on comparing the operating pattern and a detection moving average, as shown in box 812; generating a notification based on the change, as shown in box 814; and sending the notification for display on a display interface, as shown in box 816.

The above detailed description and embodiments of the disclosed computing system 100 are not intended to be exhaustive or to limit the disclosed computing system 100 to the precise form disclosed above. While specific examples for the computing system 100 are described above for illustrative purposes, various equivalent modifications are possible within the scope of the disclosed computing system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the invention has been described in conjunction with a specific best mode, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operating a computing system comprising:
   generating a filtered data set based on a data set;
   grouping the filtered data set based on a previous origin indicator to obtain a device group data;
   generating a label based on the device group data;
   generating a training moving average based on the label and the device group data;
   generating an operating pattern based on the training moving average;
   identifying a change in a driving behavior based on comparing the operating pattern and a detection moving average;
   generating a notification based on the change; and
   sending the notification for display on a display interface.

2. The method as claimed in claim 1 wherein generating the operating pattern includes grouping the training moving average based on K-Means Clustering.

3. The method as claimed in claim 1 wherein generating the label includes:
   generating a deviation speed profile for the device group data based on a previous average speed and a known speed limit for one or more segments of one or more paths traversed during consecutive trips;
   calculating a proximity score based on the deviation speed profile;
   determining whether the proximity score is greater than a proximity threshold value; and
   generating the label based on the proximity score being greater than the proximity threshold value.

4. The method as claimed in claim 1 wherein generating the label includes:
   generating an acceleration speed profile for the device group data based on a previous sum of acceleration force values during consecutive trips;
   calculating a proximity score based on the acceleration speed profile;
   determining whether the proximity score is greater than a proximity threshold value; and
   generating the label based on the proximity score being greater than the proximity threshold value.

5. The method as claimed in claim 1 further comprising normalizing the device group data based on a previous trip length to compare the device group data based on the previous trip length.

6. The method as claimed in claim 1 further comprising rescaling the training moving average based on a scale from [0, 1] to compare the training moving average based on the scale.

7. The method as claimed in claim 1 wherein sending the notification for display on the display interface includes sending the notification based on a decision window.

8. A computing system comprising:
   a control unit configured to:
      generate a filtered data set based on a data set;
      group the filtered data set based on a previous origin indicator to obtain a device group data;
      generate a label based on the device group data;
      generate a training moving average based on the label and the device group data;
      generate an operating pattern based on the training moving average;
      identify a change in a driving behavior based on comparing the operating pattern and a detection moving average;
      generate a notification based on the change; and
   a communication unit, coupled to the control unit, configured to:
      send the notification for display on a display interface.

9. The computing system as claimed in claim 8 wherein the control unit is further configured to group the training moving average based on K-Means Clustering.

10. The computing system as claimed in claim 8 wherein the control unit is further configured to:

generate a deviation speed profile for the device group data based on a previous average speed and a known speed limit for one or more segments of one or more paths traversed during consecutive trips;

calculate a proximity score based on the deviation speed profile;

determine whether the proximity score is greater than a proximity threshold value; and generate the label based on the proximity score being greater than the proximity threshold value.

11. The computing system as claimed in claim 8 wherein the control unit is further configured to:

generate an acceleration speed profile for the device group data based on a previous sum of acceleration force values during consecutive trips;

calculate a proximity score based on the acceleration speed profile;

determine whether the proximity score is greater than a proximity threshold value; and generate the label based on the proximity score being greater than the proximity threshold value.

12. The computing system as claimed in claim 8 wherein the control unit is further configured to normalize the device group data based on a previous trip length to compare the device group data based on the previous trip length.

13. The computing system as claimed in claim 8 wherein the control unit is further configured to rescale the training moving average based on a scale from [0, 1] to compare the training moving average based on the scale.

14. A non-transitory computer readable medium including instructions for operating a computing system comprising:

generating a filtered data set based on a data set;

grouping the filtered data set based on a previous origin indicator to obtain a device group data;

generating a label based on the device group data;

generating a training moving average based on the label and the device group data;

generating an operating pattern based on the training moving average;

identifying a change in a driving behavior based on comparing the operating pattern and a detection moving average;

generating a notification based on the change; and sending the notification for display on a display interface.

15. The non-transitory computer readable medium as claimed in claim 14 with instructions wherein generating the operating pattern includes grouping the training moving average based on K-Means Clustering.

16. The non-transitory computer readable medium as claimed in claim 14 with instructions wherein generating the label includes:

generating a deviation speed profile for the device group data based on a previous average speed and a known speed limit for one or more segments of one or more paths traversed during consecutive trips;

calculating a proximity score based on the deviation speed profile;

determining whether the proximity score is greater than a proximity threshold value; and generating the label based on the proximity score being greater than the proximity threshold value.

17. The non-transitory computer readable medium as claimed in claim 14 with instructions wherein generating the label includes:

generating an acceleration speed profile for the device group data based on a previous sum of acceleration force values during consecutive trips;

calculating a proximity score based on the acceleration speed profile;

determining whether the proximity score is greater than a proximity threshold value; and generating the label based on the proximity score being greater than the proximity threshold value.

18. The non-transitory computer readable medium as claimed in claim 14 with instructions further comprising normalizing the device group data based on a previous trip length to compare the device group data based on the previous trip length.

19. The non-transitory computer readable medium as claimed in claim 14 with instructions further rescaling the training moving average based on a scale from [0, 1] to compare the training moving average based on the scale.

20. The non-transitory computer readable medium as claimed in claim 14 with instructions wherein sending the notification for display on the display interface includes sending the notification based on a decision window.

\* \* \* \* \*